(12) United States Patent
Chen et al.

(10) Patent No.: US 11,171,977 B2
(45) Date of Patent: Nov. 9, 2021

(54) UNSUPERVISED SPOOFING DETECTION FROM TRAFFIC DATA IN MOBILE NETWORKS

(71) Applicant: NEC Laboratories America, Inc., Princeton, NJ (US)

(72) Inventors: Haifeng Chen, West Windsor, NJ (US); Bo Zong, West Windsor, NJ (US); Christian Lumezanu, Princeton Junction, NJ (US)

(73) Assignee: NEC Corporation

( * ) Notice: Subject to any disclaimer, the term of this patent is extended or adjusted under 35 U.S.C. 154(b) by 402 days.

(21) Appl. No.: 16/246,774

(22) Filed: Jan. 14, 2019

(65) Prior Publication Data

US 2019/0260778 A1 Aug. 22, 2019

Related U.S. Application Data

(60) Provisional application No. 62/632,190, filed on Feb. 19, 2018.

(51) Int. Cl.
*H04L 29/06* (2006.01)
*G06N 20/00* (2019.01)
*H04W 12/122* (2021.01)

(52) U.S. Cl.
CPC ......... *H04L 63/1425* (2013.01); *G06N 20/00* (2019.01); *H04L 63/1466* (2013.01); *H04W 12/122* (2021.01)

(58) Field of Classification Search
CPC ........... H04L 63/1425; H04L 63/1466; H04W 12/122; G06N 20/00
See application file for complete search history.

(56) References Cited

U.S. PATENT DOCUMENTS

2016/0285700 A1\* 9/2016 Gopalakrishnan .... H04L 41/142
2019/0058715 A1\* 2/2019 Abbaszadeh ....... H04L 63/1416
(Continued)

OTHER PUBLICATIONS

Haowen Xu, Wenxiao Chen, Nengwen Zhao, Zeyan Li, Jiahao Bu, Zhihan Li, Ying Liu, Youjian Zhao, Dan Pei, Yang Feng, Jie Chen, Zhaogang Wang and Honglin Qiao, "Unsupervised Anomaly Detection via Variational Auto-Encoder for Seasonal KPIs in Web Applications", Feb. 12, 2018, IW3C2, pp. 1-11. (Year: 2018).\*

(Continued)

*Primary Examiner* — Joseph P Hirl
*Assistant Examiner* — Chi D Nguy
(74) *Attorney, Agent, or Firm* — Joseph Kolodka

(57) ABSTRACT

A method for detecting spoofing attacks from network traffic log data is presented. The method includes training a spoofing attack detector with the network traffic log data received from one or more mobile networks by extracting features that are relevant to spoofing attacks for training data, building a first set of vector representations for the network traffic log data, training an anomaly detection model by employing DAGMM, and obtaining learned parameters of DAGMM. The method includes testing the spoofing attack detector with the network traffic log data received from the one or more mobile networks by extracting features that are relevant to spoofing attacks for testing data, building a second set of vector representations for the network traffic log data, obtaining latent representations of the testing data, computing a z-score of the testing data, and creating a spoofing attack alert report listing traffic logs generating z-scores exceeding a predetermined threshold.

14 Claims, 10 Drawing Sheets

(56) References Cited

U.S. PATENT DOCUMENTS

2019/0197238 A1* 6/2019 Canedo ................. G06F 21/554
2019/0244132 A1* 8/2019 Ide .......................... G06F 17/18

OTHER PUBLICATIONS

Zong, et al., "Deep Autoencoding Gaussian Mixture Model for Unsupervised Anomaly Detection", Seventh International Conference on Learning Representations. Apr. 30-May 3, 2018. pp. 1-19.

* cited by examiner

UNSUPERVISED SPOOFING DETECTION FROM TRAFFIC DATA IN MOBILE NETWORKS

RELATED APPLICATION INFORMATION

This application claims priority to Provisional Application No. 62/632,190, filed on Feb. 19, 2018, the contents of which are incorporated herein by reference in their entirety.

BACKGROUND

Technical Field

The present invention relates to cybersecurity in mobile networks and, more particularly, to unsupervised spoofing detection from traffic data in mobile networks.

Description of the Related Art

Intrusion detection systems (IDSs) are an integral part of any complete security package of a modern, well managed network system. The most widely deployed and commercially available methods for intrusion detection employ signature-based detection. These methods extract features from various audit streams, and detect intrusions by comparing the feature values to a set of attack signatures provided by human experts. Such methods can only detect previously known intrusions since these intrusions have a corresponding signature. The signature database has to be manually revised for each new type of attack that is discovered and until this revision, systems are vulnerable to these attacks.

SUMMARY

A computer-implemented method for detecting spoofing attacks from network traffic log data is presented. The method includes training a spoofing attack detector with the network traffic log data received from one or more mobile networks by extracting features that are relevant to spoofing attacks for training data, building a first set of vector representations for the network traffic log data, training an anomaly detection model by employing a deep auto-encoding Gaussian mixture model (DAGMM), obtaining learned parameters of DAGMM, and storing the learned parameters in a database. The method further includes testing the spoofing attack detector with the network traffic log data received from the one or more mobile networks by extracting features that are relevant to spoofing attacks for testing data, building a second set of vector representations for the network traffic log data, obtaining latent representations of the testing data by the learned model from the training phase, computing a z-score of the testing data based on the latent representations of the testing data, and creating a spoofing attack alert report listing traffic logs generating z-scores exceeding a predetermined threshold.

A non-transitory computer-readable storage medium comprising a computer-readable program is presented for detecting spoofing attacks from network traffic log data, wherein the computer-readable program when executed on a computer causes the computer to perform the steps of training a spoofing attack detector with the network traffic log data received from one or more mobile networks by extracting features that are relevant to spoofing attacks for training data, building a first set of vector representations for the network traffic log data, training an anomaly detection model by employing a deep auto-encoding Gaussian mixture model (DAGMM), obtaining learned parameters of DAGMM, and storing the learned parameters in a database. The method further includes testing the spoofing attack detector with the network traffic log data received from the one or more mobile networks by extracting features that are relevant to spoofing attacks for testing data, building a second set of vector representations for the network traffic log data, obtaining latent representations of the testing data by the learned model from the training phase, computing a z-score of the testing data based on the latent representations of the testing data, and creating a spoofing attack alert report listing traffic logs generating z-scores exceeding a predetermined threshold.

A system for detecting spoofing attacks from network traffic log data is presented. The system includes a training module for training a spoofing attack detector with the network traffic log data received from one or more mobile networks by extracting features that are relevant to spoofing attacks for training data, building a first set of vector representations for the network traffic log data, training an anomaly detection model by employing a deep auto-encoding Gaussian mixture model (DAGMM), obtaining learned parameters of DAGMM, and storing the learned parameters in a database. The system further includes a testing module for testing the spoofing attack detector with the network traffic log data received from the one or more mobile networks by extracting features that are relevant to spoofing attacks for testing data, building a second set of vector representations for the network traffic log data, obtaining latent representations of the testing data by the learned model from the training phase, computing a z-score of the testing data based on the latent representations of the testing data and creating a spoofing attack alert report listing traffic logs generating z-scores exceeding a predetermined threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
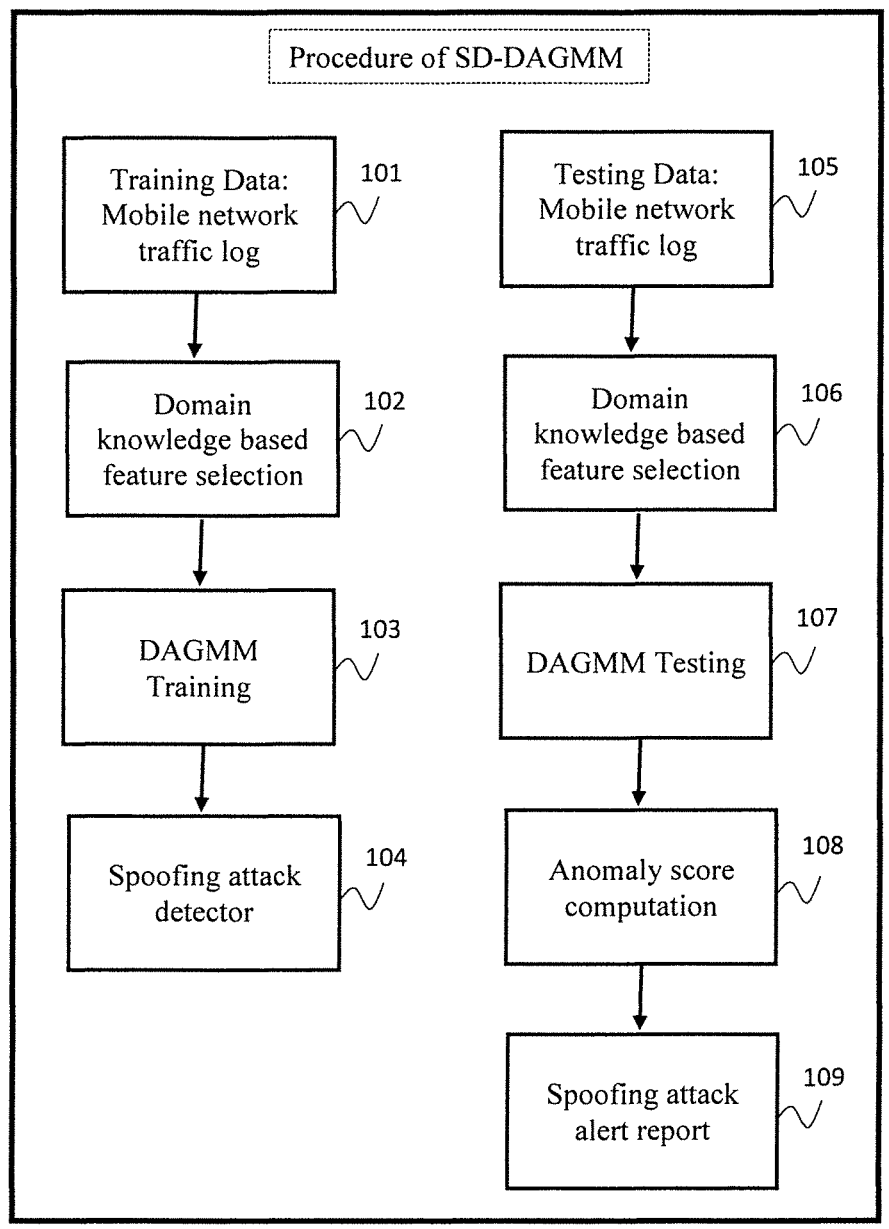
FIG. 1 is a block/flow diagram of an example spoofing detection by deep auto-encoding Gaussian Mixture Model (SD-DAGMM) for spoofing detection in mobile networks, in accordance with embodiments of the present invention.

Spoofing attacks are a threat to cybersecurity in mobile networks. It is difficult to capture such spoofing attacks by traditional signature based methods, as malware remains at remote servers and performs spoofing attacks through incoming traffic. Instead, spoofing attacks can be captured by analyzing network traffic data. Because of their malicious intentions, the network traffic initiated by spoofing attacks should be different from the network traffic generated by normal users. To this end, the spoofing attack detection problem can be formulated as an unsupervised anomaly detection problem. Given network traffic records from mobile networks, the goal is to discover anomalous records that are likely to be initiated by spoofing attacks. However, it is difficult for existing anomaly detection methods to accurately discover spoofing attacks from the network traffic data. Network traffic data are high dimensional with high variance. Because of high dimensions in network traffic data, the existing anomaly detection methods suffer from dimensionality. Additionally, the high variance caused by traffic dynamics makes all data points appear different from each other, which makes it difficult for existing techniques to model the commonalties among normal traffic.

The exemplary embodiments of the present invention implement a SD-DAGMM (Spoofing Detection by Deep Auto-encoding Gaussian Mixture Model), which is a deep learning based method that detects spoofing attacks from network traffic data. In general, it includes training and testing phases.

In the training phase, the methods are given a set of network traffic data to train a detector. In this phase, the methods leverage the domain knowledge in mobile networks to extract the features that are relevant to spoofing attacks and build vector representations for the network traffic data. Then, the methods employ DAGMM to learn a detector that best evaluates the similarity/dissimilarity of the training data.

In the testing phase, the methods deal with incoming traffic data. In this phase, the methods repeat the same feature extraction method used in the training phase to convert traffic data into their vector representations, evaluate their similarity by the learned detector, and then report anomalous traffic records that are significantly different from the majority of traffic records, as potential spoofing attack traffic.

Moreover, the exemplary embodiments of the present invention implement an SD-DAGMM to address the challenges of high dimensionality and high variance pertaining to spoofing attack detection. First, the exemplary embodiments employ feature selection methods based on the domain knowledge in mobile networks and extract the features of traffic records that are relevant to spoofing attacks. In this way, both the dimensionality and variance of network traffic data are significantly reduced. Second, in the exemplary embodiments, as the number of dimensions in the extracted feature representations for traffic records could still be high, a state-of-the-art deep learning technique, e.g., DAGMM, can be employed to build a robust anomaly detection model for high-dimensional data.

In addition, the exemplary embodiments of the present invention provide a unified method to define an anomaly score for traffic records in the framework of DAGMM so that the decision of anomaly threshold is independent to the data used to train models.

FIG. 1 is a block/flow diagram of an example deep auto-encoding Gaussian Mixture Model (SD-DAGMM) for spoofing detection in mobile networks, in accordance with embodiments of the present invention.

The training module 864 (FIG. 8) includes the training data 101, the domain knowledge based feature selection 102, the DAGMM training module 103, and the spoofing attack detector 104. The testing module 866 (FIG. 8) includes the testing data 105, the domain knowledge based feature extraction 106, the DAGMM testing module 107, the anomaly score computation module 108, and the spoofing attack alert report 109.

Regarding the training data 101, the training data 101 is used for training SD-DAGMM. These data are traffic logs from mobile networks, including the following information:

Timestamp, which is used to indicate the time when the traffic data is received by a device.

Log type, which indicates which type of log message the network traffic carries, such as InvokeSendAuthenticationInfo, InvokeUpdateGprsLocation, and so on.

The global title (GT), which is the address used in the skinny client control protocol (SCCP) for routing signaling messages on telecommunications networks.

The international mobile subscriber ID (IMSI).

The mobile subscriber ID (MSIS).

Regarding the domain knowledge based feature selection 102, the features are extracted that are relevant to a spoofing attack for training data.

Regarding DAGMM training 103, the state-of-the-art anomaly detection technique DAGMM is employed to train a model.

Regarding the spoofing attack detector 104, the learned parameters of DAGMM are obtained and stored in a database for subsequent detection tasks.

Regarding the testing data 105, any traffic logs from mobile networks can be treated as testing data. SD-DAGMM will report which traffic logs are likely to include spoofing attacks.

Regarding the domain knowledge base feature selection 106, the same approach used in block 102 is adopted to extract relevant features for testing data.

Regarding the DAGMM testing 107, the deep autoencoder in DAGMM is employed to obtain the latent representations of testing data.

Regarding the anomaly score computation 108, the z-score of testing data is calculated or computed based on the latent representations of testing data and the learned Gaussian mixture model in DAGMM.

Regarding the spoofing attack alert report 109, alerts to traffic logs that generate high z-score are reported.

Figure 2:
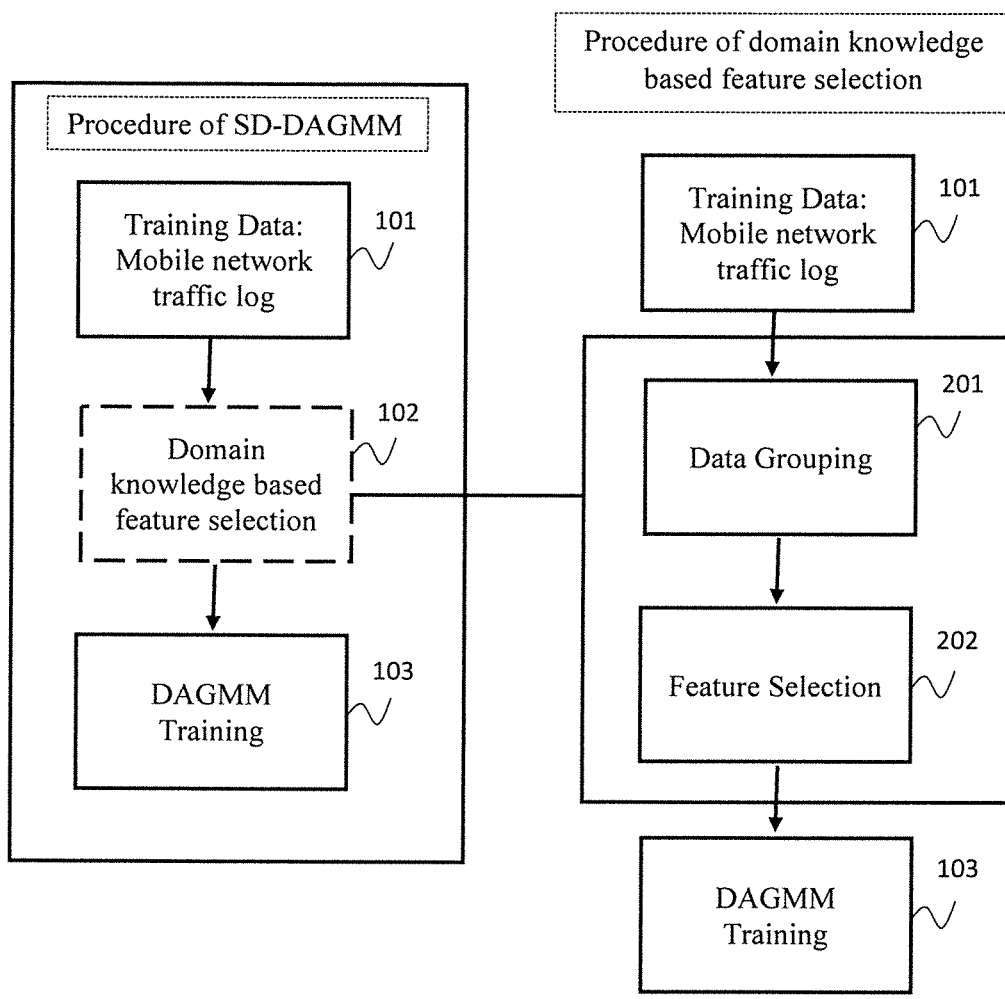
FIG. 2 is a block/flow diagram of an example of domain knowledge based feature selection, in accordance with embodiments of the present invention.

FIG. 2 is a block/flow diagram of an example of domain knowledge based feature selection, in accordance with embodiments of the present invention.

Regarding data grouping 201, in SD-DAGMM, the method first partitions the time dimension into non-over-lapped time bins, starting at epoch time 0 with time length 30 seconds. Then, the method puts traffic logs in the same time bin into one group, and SD-DAGMM predicts whether one group includes a spoofing attack. Next, feature selection for logs in individual groups is performed.

Regarding feature selection 202, in SD-DAGMM, the method extracts six features that are relevant to spoofing attacks in mobile networks.

Number of unmatched "InvokeSendAuthenticationInfo" logs in a group: An "InvokeSendAuthenticationInfo" log is unmatched if the methods cannot find an "InvokeUpdateGprsLocation" or "InvokeUpdateLocation" log that shares identical GT and IMSI information within this group.

Number of unmatched "InvokeUpdateGprsLocation" or "InvokeUpdateLocation" logs in a group: An "InvokeUpdateGprsLocation" or "InvokeUpdateLocation" logs is unmatched if the methods cannot find an "InvokeSendAuthenticationInfo" log that shares identical GT and IMSI information in this group.

Number of unmatched "InvokeSendRoutingInfoForSM" logs in a group: An "InvokeSendRoutingInfoForSM" log is unmatched if the methods cannot find an "InvokeMtForwardSM" log that share identical GT and MSIS information in this group.

Number of unmatched "InvokeMtForwardSM" logs in a group: An "InvokeMtForwardSM" is unmatched if the methods cannot find an "InvokeSendRoutingInfoForSM" log that shares identical GT and MSIS information in this group.

Number of pairs of "InvokeInsertSubscriberData" logs that share similar GT information: For a pair of "InvokeInsertSubscriberData" logs with GT a and b, their GT similarity is the length of the common prefix of a and b normalized by the maximal length between a and b, $$GTSimlarity = \frac{CommonPrefixLength(a, b)}{\max(length(a), length(b))}.$$

If their GT similarity is greater than 0.75, a and b are similar.

Number of pairs of "InvokeMoForwardSM" logs that share similar GT information.

After block 202, a feature representation for traffic logs within a group is obtained.

Figure 3:
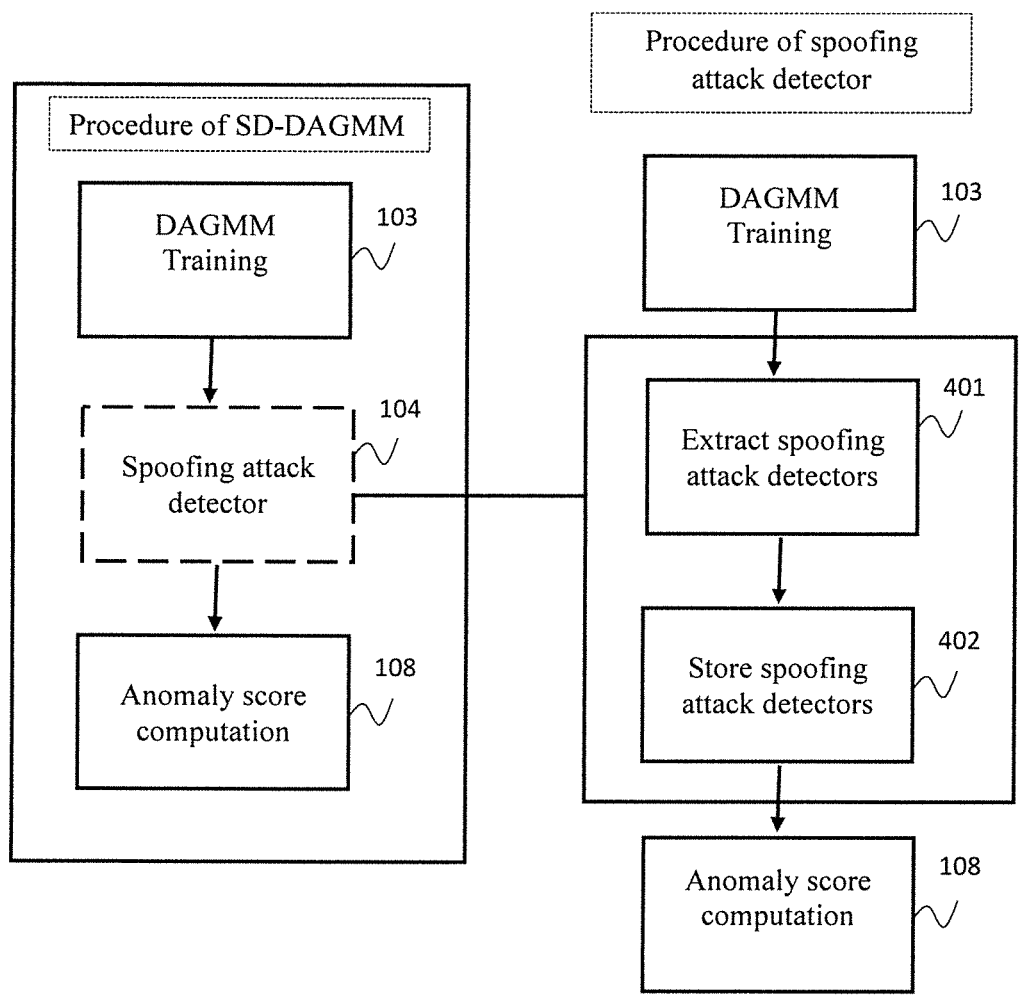
FIG. 3 is a block/flow diagram of an example spoofing attack detector, in accordance with embodiments of the present invention.

FIG. 3 is a block/flow diagram of an example spoofing attack detector, in accordance with embodiments of the present invention.

At block 401, extract spoofing attack detectors from learned DAGMM. Given a DAGMM learned from the training data, a spoofing attack detector includes two sets of learned parameters.

The first set of parameters relate to a deep autoencoder. With the parameters of the deep autoencoder in DAGMM, the method is able to project network traffic log data from their feature space to a compact latent space.

The second set of parameters relate to a Gaussian mixture model (GMM). With the estimated parameters in GMM, the method is able to evaluate whether a group of traffic logs are anomalous in terms of spoofing attack related features.

In particular, if the GMM has K mixture components, the estimated parameters include (1) mixture coefficients $\phi_1, \ldots, \phi_K$, and (2) component means and covariance ($\mu_1, \sigma_1$), ..., ($\mu_K, \sigma_K$).

At block 402, store spoofing attack detectors into one or more databases. Spoofing attack detectors obtained from 401 are stored in a database system (e.g., elasticsearch) for future detection tasks.

Figure 4:
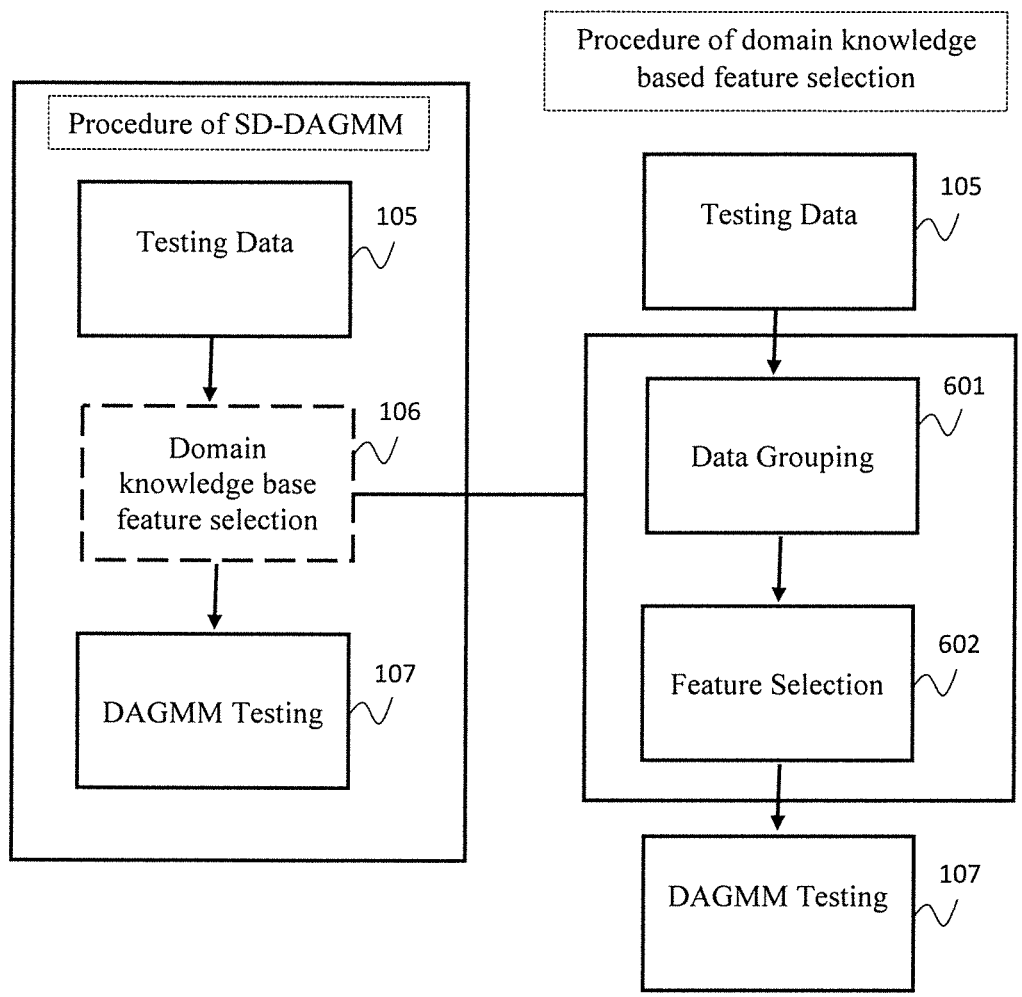
FIG. 4 is a block/flow diagram of an example domain knowledge based feature selection for testing data, in accordance with embodiments of the present invention.

FIG. 4 is a block/flow diagram of an example domain knowledge based feature selection for testing data, in accordance with embodiments of the present invention.

Regarding data grouping 601, the method uses the same method described in block 201 to partition testing data into multiple groups.

Regarding feature selection 602, the method adopts the same approach described in block 202 to extract 6-dimensional features for each individual group, including:

Number of unmatched "InvokeSendAuthenticationInfo" logs in a group;

Number of unmatched "InvokeUpdateGprsLocation" or "InvokeUpdateLocation" logs in a group;

Number of unmatched "InvokeSendRoutingInfoForSM" logs in a group;

Number of unmatched "InvokeMtForwardSM" logs in a group;

Number of pairs of "InvokeInsertSubscriberData" logs that share similar GT information;

Number of pairs of "InvokeMoForwardSM" logs that share similar GT information.

Figure 5:
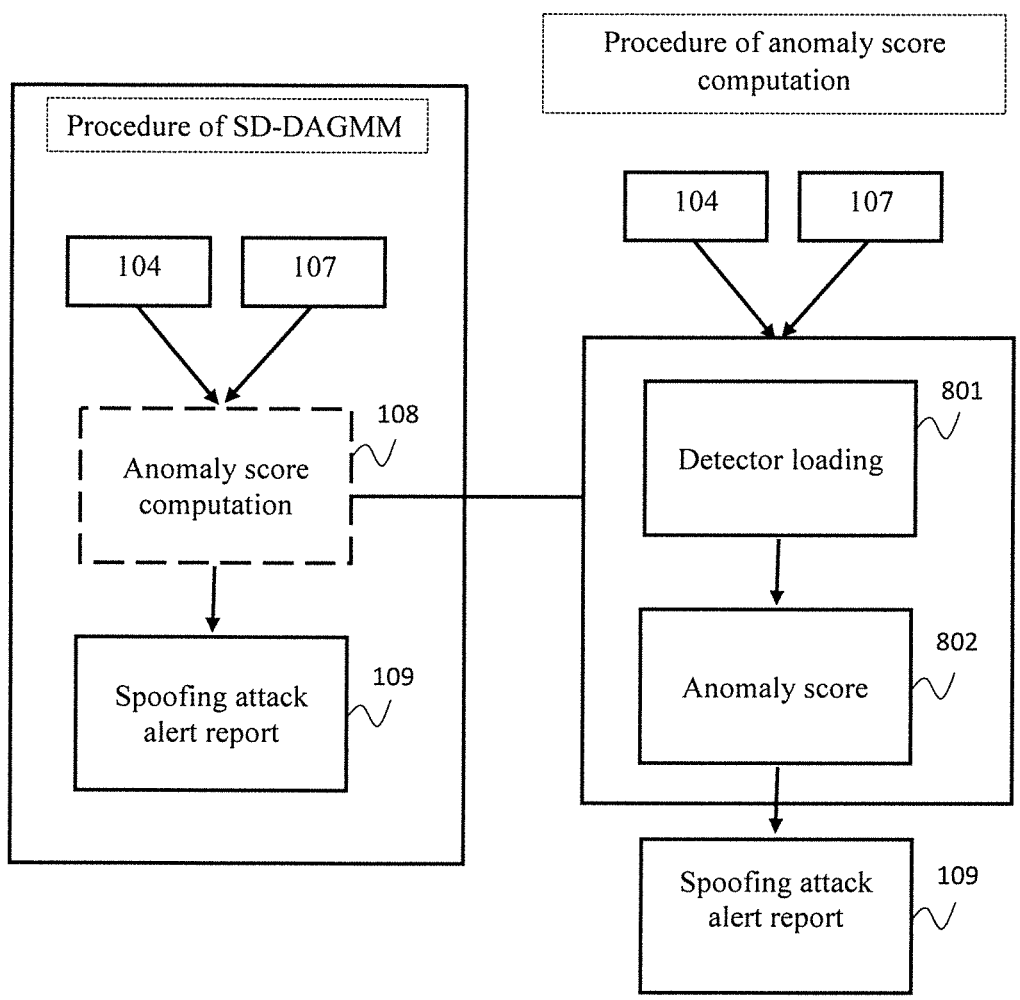
FIG. 5 is a block/flow diagram of an example anomaly score computation for the Gaussian Mixture Model (GMM), in accordance with embodiments of the present invention.

FIG. 5 is a block/flow diagram of an example anomaly score computation for the Gaussian Mixture Model (GMM), in accordance with embodiments of the present invention.

Regarding detector loading 801, SD-DAGMM first loads the detector from a database including all the parameters specified in block 401.

Regarding anomaly score 802, given h is the latent representation of feature vector x output by the deep autoencoder from DAGMM, the methods adapt the idea of z-score for Gaussian distribution to the case of Gaussian mixture models, and compute by the equation:

$$z = \sum_{i=1}^{K} \phi_i \frac{|h - \mu_i|}{\sigma_i},$$

where $\mu$ is the mean deviation, $\sigma$ is the standard deviation, h is the latent representation of feature vectors, and $\phi$ are mixture coefficients.

Figure 6:
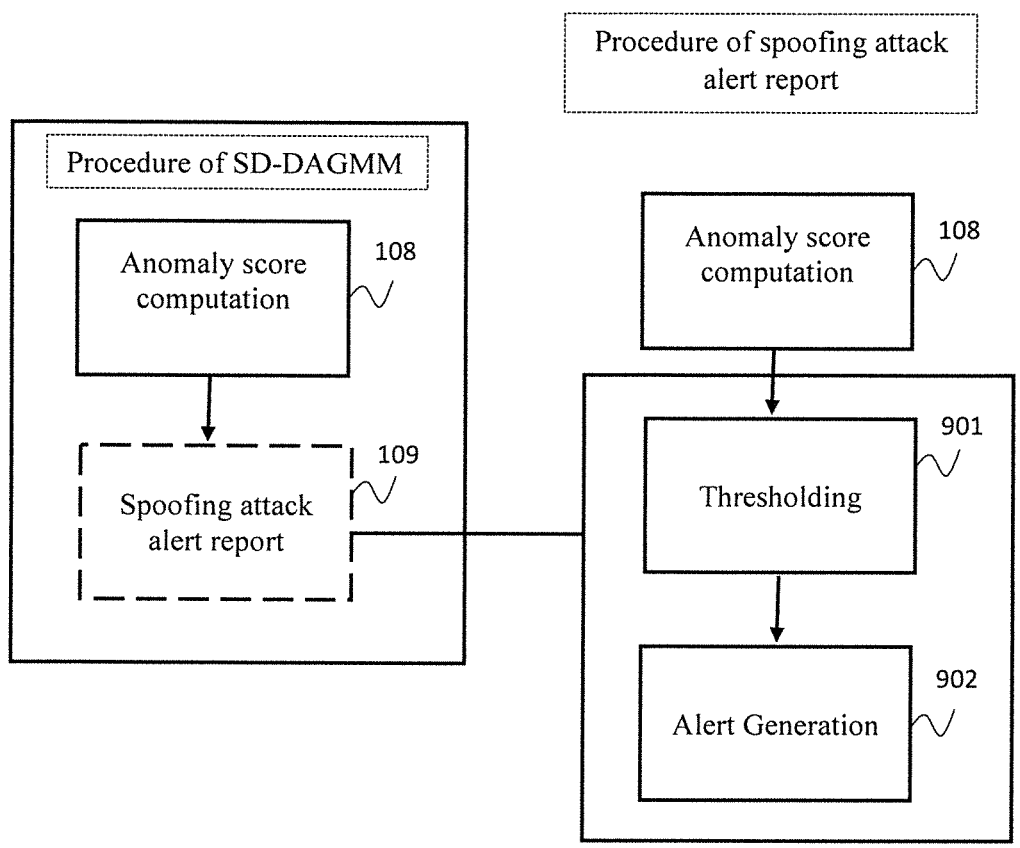
FIG. 6 is a block/flow diagram of an example procedure of a spoofing attack alert report, in accordance with embodiments of the present invention.

FIG. 6 is a block/flow diagram of an example procedure of a spoofing attack alert report, in accordance with embodiments of the present invention.

Regarding thresholding 901, with the z-score computed in block 802, the method compares the z-score with a predefined or predetermined threshold. If the z-score is higher than the threshold, SD-DAGMM will report an alert to the traffic logs covered by the underlying group.

Regarding alert generation 902, for each alert, the alert generation includes the start and end time of the log group, and the alert will inserted into alert database, where users can review and analyze them.

Figure 7:
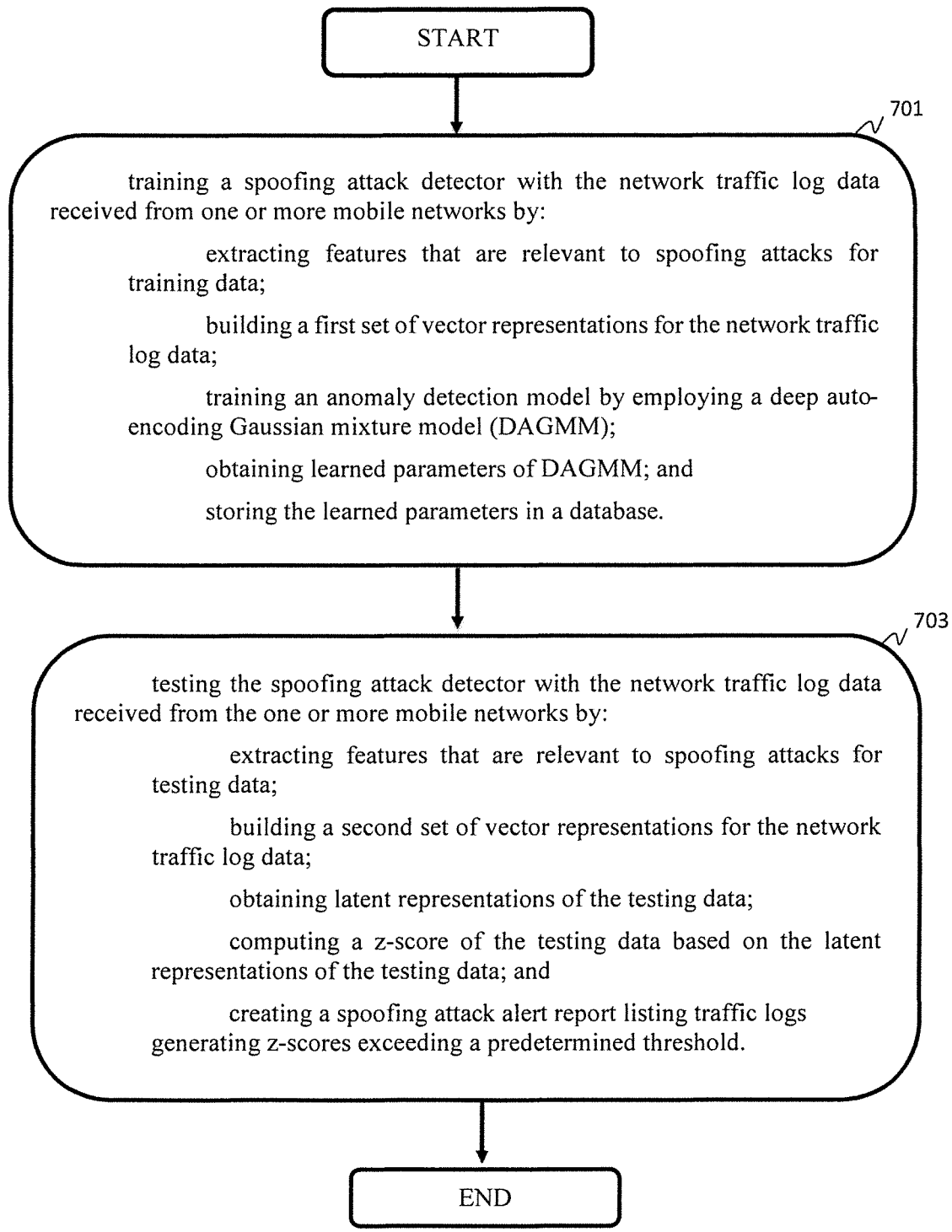
FIG. 7 is block/flow diagram of an exemplary method for detecting spoofing attacks from network traffic data, in accordance with embodiments of the present invention.

FIG. 7 is block/flow diagram of an exemplary method for detecting spoofing attacks from network traffic data, in accordance with embodiments of the present invention.

At block 701, a spoofing attack detector is trained with the network traffic log data received from one or more mobile networks by extracting features that are relevant to spoofing attacks for training data, building a first set of vector representations for the network traffic log data, training an anomaly detection model by employing a deep auto-encoding Gaussian mixture model (DAGMM), obtaining learned parameters of DAGMM, and storing the learned parameters in a database.

At block 703, the spoofing attack detector is tested with the network traffic log data received from the one or more mobile networks by extracting features that are relevant to spoofing attacks for testing data, building a second set of vector representations for the network traffic log data, obtaining latent representations of the testing data, computing a z-score of the testing data based on the latent representations of the testing data, and creating a spoofing attack alert report listing traffic logs generating z-scores exceeding a predetermined threshold.

Figure 8:
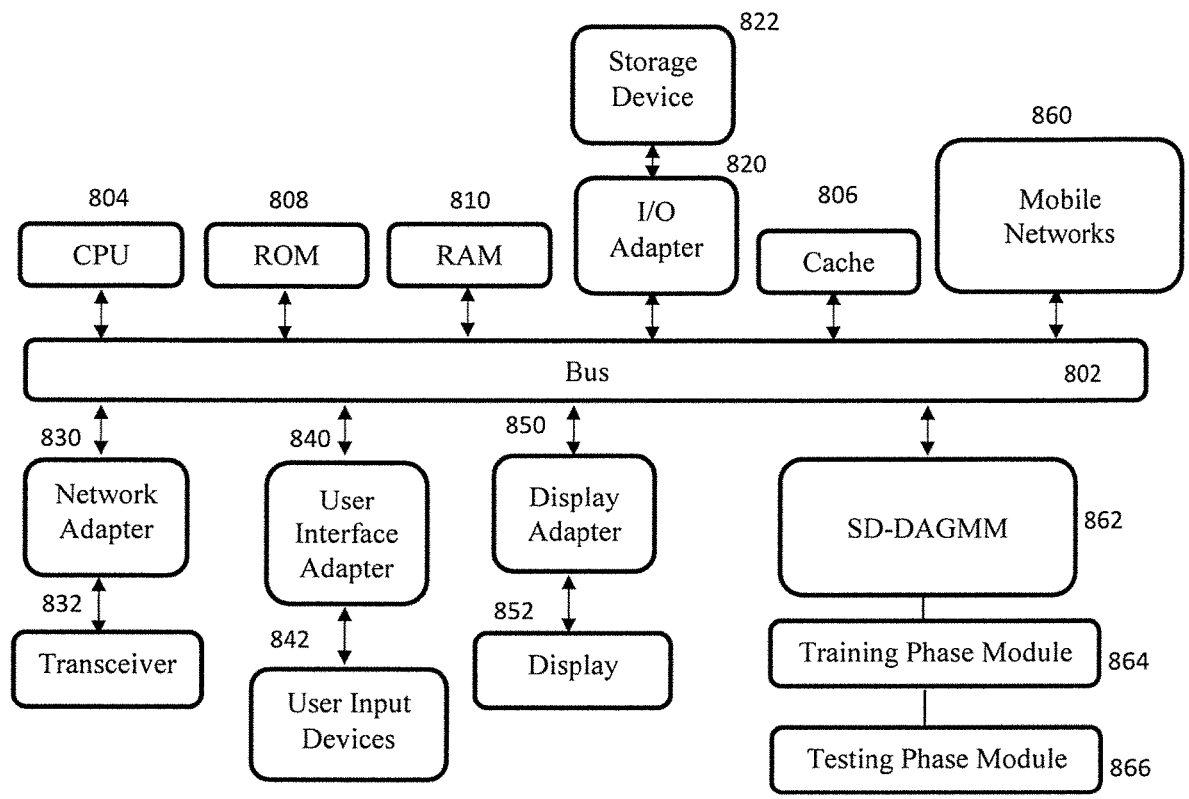
FIG. 8 is block/flow diagram of an exemplary processing system for detecting spoofing attacks from network traffic data, in accordance with embodiments of the present invention.

FIG. 8 is block/flow diagram of an exemplary processing system for detecting spoofing attacks from network traffic data, in accordance with embodiments of the present invention.

The processing system includes at least one processor or processor device (CPU) 804 operatively coupled to other components via a system bus 802. A cache 806, a Read Only Memory (ROM) 808, a Random Access Memory (RAM) 810, an input/output (I/O) adapter 820, a network adapter 830, a user interface adapter 840, and a display adapter 850, are operatively coupled to the system bus 802. Mobile networks 860 can be connected to bus 802. The mobile networks 860 can employ a SD-DAGMM 862 including a training module 864 and a testing module 866.

A storage device 822 is operatively coupled to system bus 802 by the I/O adapter 820. The storage device 822 can be any of a disk storage device (e.g., a magnetic or optical disk storage device), a solid state magnetic device, and so forth.

A transceiver 832 is operatively coupled to system bus 802 by network adapter 830.

User input devices 842 are operatively coupled to system bus 802 by user interface adapter 840. The user input devices 842 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 842 can be the same type of user input device or different types of user input devices. The user input devices 842 are used to input and output information to and from the processing system.

A display device 852 is operatively coupled to system bus 802 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
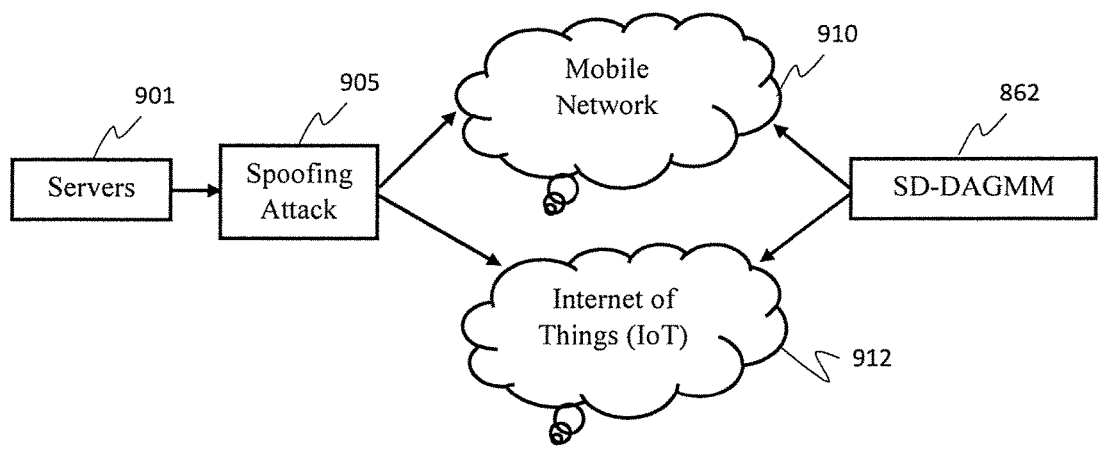
FIG. 9 is block/flow diagram of an exemplary mobile network employing the spoofing detection by deep auto-encoding Gaussian Mixture Model (SD-DAGMM), in accordance with embodiments of the present invention.

FIG. 9 is block/flow diagram of an exemplary mobile network employing the spoofing detection by deep auto-encoding Gaussian Mixture Model (SD-DAGMM), in accordance with embodiments of the present invention.

A plurality of mobile networks 910 can be attacked by a spoofing attack device 905, which communicates with a plurality of servers 901. The spoofing attack device 905 can also be used to attack other networks, such as IoT networks 912. The SD-DAGMM 862 can be employed to protect the mobile networks 910 and the IoT networks 912.

Figure 10:
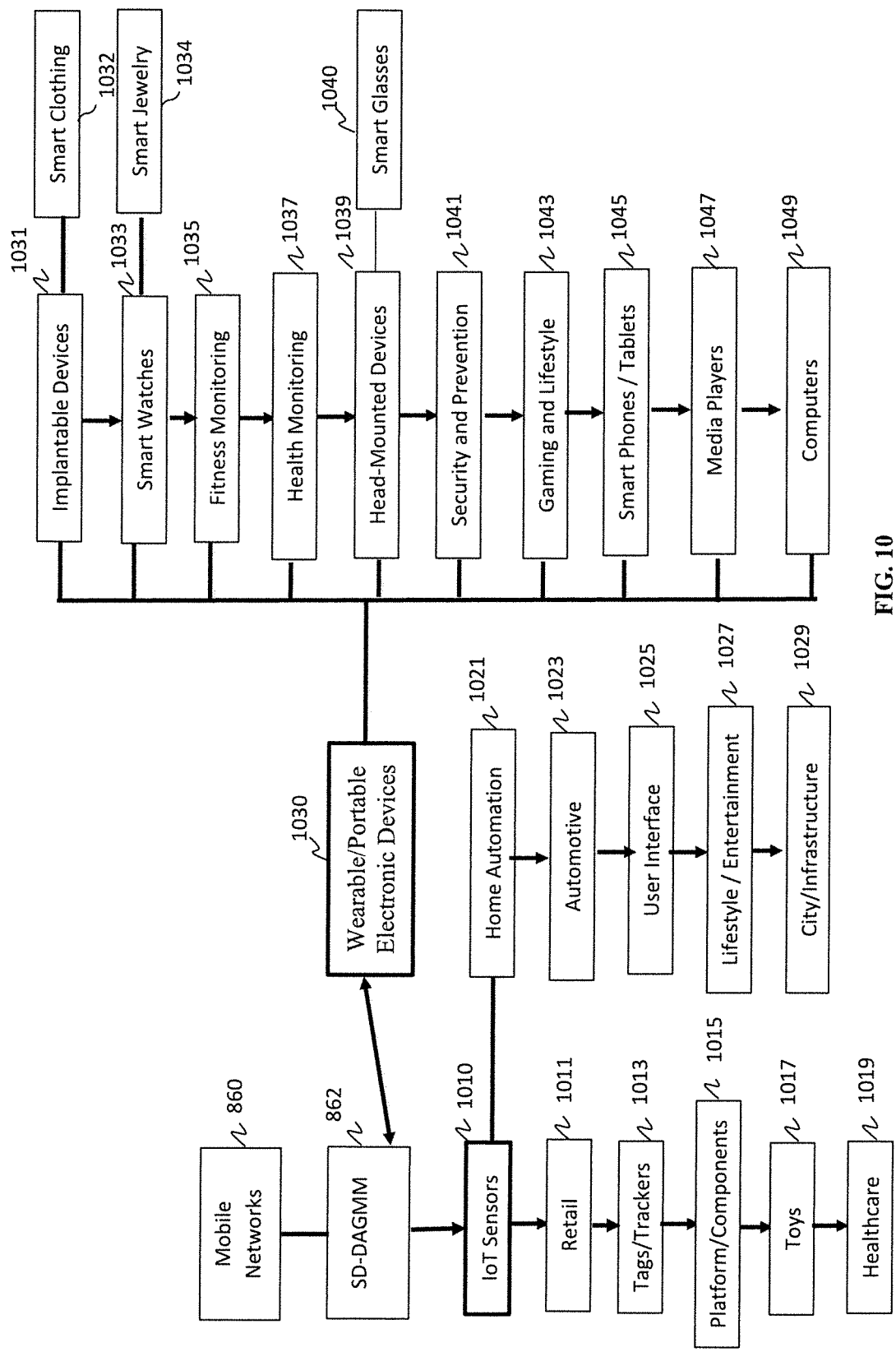
FIG. 10 is a block/flow diagram of an exemplary method for extracting features that are relevant to spoofing attacks in Internet of Things (IoT) systems or devices or infrastructure, in accordance with embodiments of the present invention.

FIG. 10 is a block/flow diagram of an exemplary method for extracting features that are relevant to spoofing attacks in Internet of Things (IoT) systems or devices or infrastructure, in accordance with embodiments of the present invention.

IoT enables advanced connectivity of computing and embedded devices through internet infrastructure. IoT involves machine-to-machine communications (M2M), where it is important to continuously monitor connected machines to detect any anomaly or bug, and resolve them quickly to minimize downtime.

The mobile networks 860 can communicate with, e.g., wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The mobile networks 860 described herein can communicate with any type of electronic devices for any type of use or application or operation.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the mobile networks 860 of the present invention can communicate with a variety of different devices and/or systems. For example, the mobile networks 860 can communicate with wearable or portable electronic devices 1030. Wearable/portable electronic devices 1030 can include implantable devices 1031, such as smart clothing 1032. Wearable/portable devices 1030 can include smart watches 1033, as well as smart jewelry 1034. Wearable/portable devices 1030 can further include fitness monitoring devices 1035, health and wellness monitoring devices 1037, head-mounted devices 1039 (e.g., smart glasses 1040), security and prevention systems 1041, gaming and lifestyle devices 1043, smart phones/tablets 1045, media players 1047, and/or computers/computing devices 1049.

The mobile networks 860 of the present invention can further communicate with Internet of Thing (IoT) sensors 1010 for various applications, such as home automation 1021, automotive 1023, user interface 1025, lifestyle and/or entertainment 1027, city and/or infrastructure 1029, retail 1011, tags and/or trackers 1013, platform and components 1015, toys 1017, and/or healthcare 1019. Of course, one skilled in the art can contemplate such mobile networks 860 communicating with any type of electronic devices for any types of applications, not limited to the ones described herein.

Figure 11:
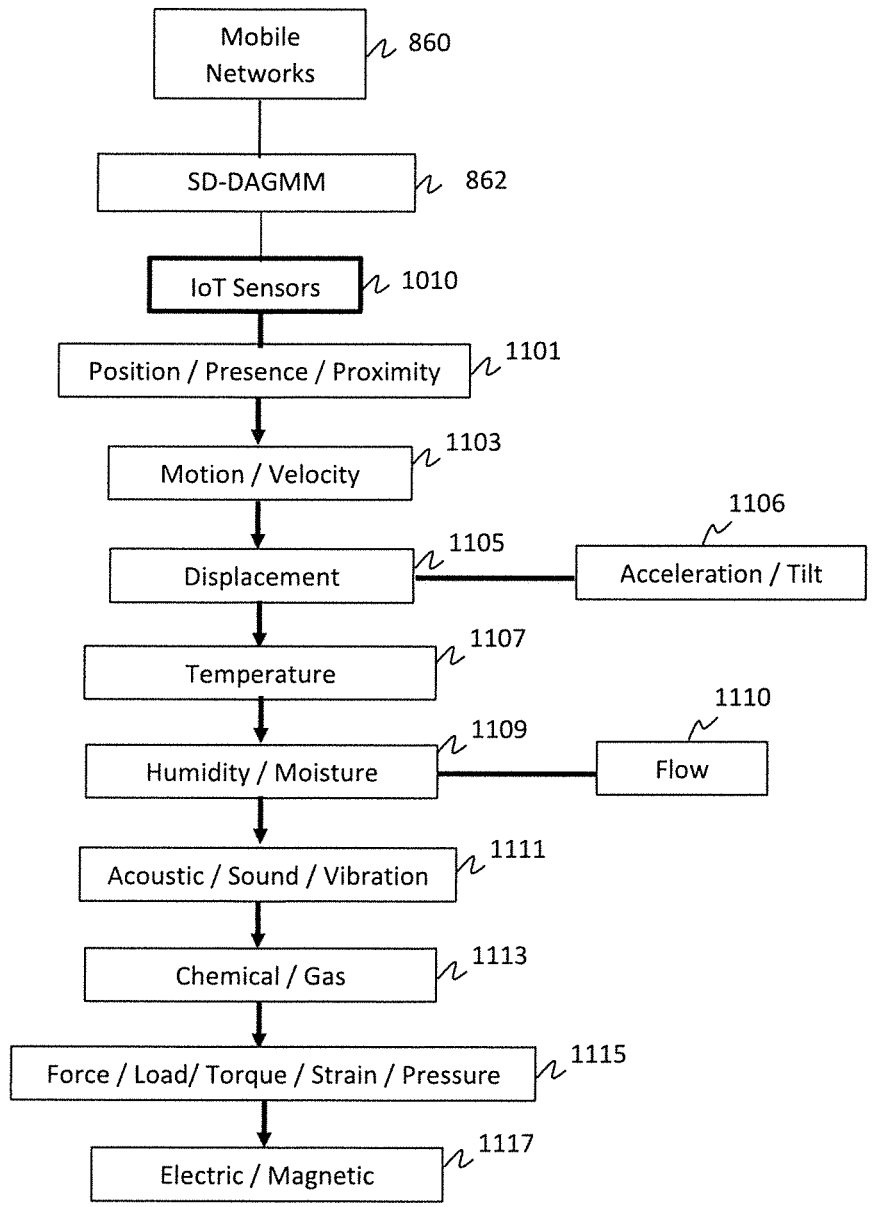
FIG. 11 is a block/flow diagram of exemplary IoT sensors used to collect data/information to extract features that are relevant to spoofing attacks, in accordance with embodiments of the present invention.

FIG. 11 is a block/flow diagram of exemplary IoT sensors used to collect data/information to extract features that are relevant to spoofing attacks, in accordance with embodiments of the present invention.

IoT loses its distinction without sensors. IoT sensors act as defining instruments which transform IoT from a standard passive network of devices into an active system capable of real-world integration.

The IoT sensors 1010 can be connected via the mobile networks 860 to transmit information/data, continuously and in in real-time. Exemplary IoT sensors 1010 can include, but are not limited to, position/presence/proximity sensors 1101, motion/velocity sensors 1103, displacement sensors 1105, such as acceleration/tilt sensors 1106, temperature sensors 1107, humidity/moisture sensors 1109, as well as flow sensors 1110, acoustic/sound/vibration sensors 1111, chemical/gas sensors 1113, force/load/torque/strain/pressure sensors 1115, and/or electric/magnetic sensors 1117. One skilled in the art can contemplate using any combination of such sensors to collect data/information and input into the modules 864, 866 of the mobile networks 860 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for detecting spoofing attacks from network traffic log data, the method comprising:
    training a spoofing attack detector with the network traffic log data received from one or more mobile networks by:
        extracting features that are relevant to spoofing attacks for training data;
        building a first set of vector representations for the network traffic log data;
        training an anomaly detection model by employing a deep auto-encoding Gaussian mixture model (DAGMM);
        obtaining learned parameters of DAGMM; and
        storing the learned parameters in a database;
        wherein the extracted features include a number of unmatched
    "InvokeSendAuthenticationInfo" logs, a number of unmatched
    "InvokeUpdateGprsLocation" logs, a number of unmatched
    "InvokeSendRoutingInfoForSM" logs, a number of unmatched "InvokeMtForwardSM" logs, a number of pairs of "InvokeInsertSubscriberData" logs that share similar global title (GT) information, and a number of pairs of "InvokeMoForwardSM" logs that share similar GT information.

2. The method of claim 1, further comprising:
    testing the spoofing attack detector with the network traffic log data received from the one or more mobile networks by:
        extracting features that are relevant to spoofing attacks for testing data;
        building a second set of vector representations for the network traffic log data;
        obtaining latent representations of the testing data by the learned model from the training phase;
        computing a z-score of the testing data based on the latent representations of the testing data; and
        creating a spoofing attack alert report listing traffic logs generating z-scores exceeding a predetermined threshold.

3. The method of claim 1, wherein the learned parameters include a first set of parameters from a deep auto-encoder and a second set of parameters from a Gaussian mixture model (GMM).

4. The method of claim 3, wherein the first set of parameters enable projection of the network traffic log data from their feature space to a compact latent space and the second set of parameters enable evaluation of whether a group of traffic logs are anomalous in terms of spoofing attack related features.

5. The method of claim 1, wherein the spoofing attack alert report includes a start time and an end time of a log group, and the generated alerts are stored in an alert database.

6. The method of claim 1, wherein the trained anomaly detection model evaluates similarities and dissimilarities of the training data.

7. The method of claim 1, wherein the testing data is partitioned into a first set of groups and the testing data is partitioned into a second set of groups.

8. A non-transitory computer-readable storage medium comprising a computer-readable program for detecting spoofing attacks from network traffic data, wherein the computer-readable program when executed on a computer causes the computer to perform the steps of:
training a spoofing attack detector with the network traffic log data received from one or more mobile networks by:
extracting features that are relevant to spoofing attacks for training data;
building a first set of vector representations for the network traffic log data;
training an anomaly detection model by employing a deep auto-encoding Gaussian mixture model (DAGMM);
obtaining learned parameters of DAGMM; and
storing the learned parameters in a database,
wherein the extracted features include a number of unmatched "InvokeSendAuthenticationInfo" logs, a number of unmatched "InvokeUpdateGprsLocation" logs, a number of unmatched "InvokeSendRoutingInfoForSM" logs, a number of unmatched "InvokeMtForwardSM" logs, a number of pairs of "InvokeInsertSubscriberData" logs that share similar global title (GT) information, and a number of pairs of "InvokeMoForwardSM" logs that share similar GT information.

9. The non-transitory computer-readable storage medium of claim 8, wherein the computer-readable program when executed on a computer causes the computer to perform the steps of:
testing the spoofing attack detector with the network traffic log data received from the one or more mobile networks by:
extracting features that are relevant to spoofing attacks for testing data;
building a second set of vector representations for the network traffic log data;
obtaining latent representations of the testing data by the learned model from the training phase;
computing a z-score of the testing data based on the latent representations of the testing data; and
creating a spoofing attack alert report listing traffic logs generating z-scores exceeding a predetermined threshold.

10. The non-transitory computer-readable storage medium of claim 8, wherein the learned parameters include a first set of parameters from a deep auto-encoder and a second set of parameters from a Gaussian mixture model (GMM).

11. The non-transitory computer-readable storage medium of claim 10, wherein the first set of parameters enable projection of the network traffic log data from their feature space to a compact latent space and the second set of parameters enable evaluation of whether a group of traffic logs are anomalous in terms of spoofing attack related features.

12. The non-transitory computer-readable storage medium of claim 8, wherein the spoofing attack alert report includes a start time and an end time of a log group, and the generated alerts are stored in an alert database.

13. The non-transitory computer-readable storage medium of claim 8, wherein the trained anomaly detection model evaluates similarities and dissimilarities of the training data.

14. The non-transitory computer-readable storage medium of claim 8, wherein the testing data is partitioned into a first set of groups and the testing data is partitioned into a second set of groups.

* * * * *